US011386264B2

(12) United States Patent
Hofer et al.

(10) Patent No.: US 11,386,264 B2
(45) Date of Patent: Jul. 12, 2022

(54) CONFIGURING COMPLEX TABLES IN A CLIENT EXPERIENCE FRAMEWORK

(71) Applicant: SAP SE, Walldorf (DE)

(72) Inventors: Andreas Hofer, Mannheim (DE); Janina Schulyk, Mannheim (DE); Carlos Martinez Gomez, Heidelberg (DE)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 16/131,663

(22) Filed: Sep. 14, 2018

(65) Prior Publication Data

US 2020/0089747 A1  Mar. 19, 2020

(51) Int. Cl.
| | | |
|---|---|---|
| *G06F 16/9535* | (2019.01) | |
| *G06F 40/177* | (2020.01) | |
| *G06F 3/0483* | (2013.01) | |
| *G06F 40/106* | (2020.01) | |
| *G06F 40/134* | (2020.01) | |
| G06F 3/0485 | (2022.01) | |
| G06F 3/04842 | (2022.01) | |
| G06F 40/197 | (2020.01) | |

(52) U.S. Cl.
CPC ......... *G06F 40/177* (2020.01); *G06F 3/0483* (2013.01); *G06F 16/9535* (2019.01); *G06F 40/106* (2020.01); *G06F 40/134* (2020.01); G06F 3/0485 (2013.01); G06F 3/04842 (2013.01); G06F 40/197 (2020.01)

(58) Field of Classification Search
CPC .... G06F 40/177; G06F 40/134; G06F 40/106; G06F 16/9535; G06F 3/0483; G06F 40/197; G06F 3/04842; G06F 3/0485; G06F 16/248; G06F 16/211; G06F 16/24535; G06F 16/90335; G06F 16/156; G06F 16/168; G06F 16/176; G06F 16/221; G06F 16/26; G06F 16/284; G06F 16/5866; G06F 16/9024; G06F 16/9038; G06F 16/904; G06F 16/93; G06F 16/94; G06F 3/0481; G06F 3/0482; G06Q 10/10
See application file for complete search history.

(56) References Cited

U.S. PATENT DOCUMENTS

| | | | | |
|---|---|---|---|---|
| 6,529,909 B1* | 3/2003 | Bowman-Amuah | | ........................ G06F 16/258 |
| 7,899,844 B2* | 3/2011 | Predovic | ............... | G06F 16/284 707/802 |
| 8,326,835 B1* | 12/2012 | Munter | ................. | G06F 16/904 707/737 |

(Continued)

*Primary Examiner* — Pierre M Vital
*Assistant Examiner* — Andalib F Lodhi
(74) *Attorney, Agent, or Firm* — Sterne, Kessler, Goldstein & Fox P.L.L.C.

(57) ABSTRACT

Disclosed herein are system, method, and computer program product embodiments for displaying object pages containing data displayed in tables in a client application. The client application may provide a user experience framework via which an administrator may pre-configure the behavior of object pages that display data related to the application in table form. A table may be configured to display using lazy loading, tab navigation, or a preview version to list report based on the nature and expected size of the table. When preview version to list report is chosen, a preview version of a table may be provided to a user to allow the user to interact with the data without displaying the entirety of the dataset.

20 Claims, 8 Drawing Sheets

(56) References Cited

U.S. PATENT DOCUMENTS

| | | | | |
|---|---|---|---|---|
| 9,239,763 | B2* | 1/2016 | Lee | G06F 16/25 |
| 10,558,651 | B2* | 2/2020 | Miller | G06F 16/2455 |
| 2007/0179813 | A1* | 8/2007 | Darling | G06Q 30/04 |
| | | | | 705/77 |
| 2008/0046462 | A1* | 2/2008 | Kaufman | G06F 16/2423 |
| 2009/0276691 | A1* | 11/2009 | Galuten | G06F 16/93 |
| | | | | 715/217 |
| 2014/0222826 | A1* | 8/2014 | DaCosta | G06F 16/2228 |
| | | | | 707/741 |
| 2014/0289391 | A1* | 9/2014 | Balaji | H04L 43/04 |
| | | | | 709/224 |
| 2015/0120805 | A1* | 4/2015 | Aghadavoodi Jolfaei | |
| | | | | H04L 67/10 |
| | | | | 709/203 |
| 2016/0171007 | A1* | 6/2016 | Bell | G06F 3/04842 |
| | | | | 715/760 |
| 2016/0196347 | A1* | 7/2016 | Cheung | G06F 16/338 |
| | | | | 707/706 |
| 2016/0232457 | A1* | 8/2016 | Gray | G06T 11/206 |
| 2017/0083526 | A1* | 3/2017 | Chin | G06F 16/2457 |
| 2017/0364568 | A1* | 12/2017 | Reynolds | G06F 3/0482 |
| 2018/0075115 | A1* | 3/2018 | Murray | G06F 16/2456 |
| 2018/0314853 | A1* | 11/2018 | Oliner | G06F 16/2477 |

\* cited by examiner

Designer Mouse Unicorn Edition
HT-4490120

| Details | | Description | Availability | Price |
|---|---|---|---|---|
| Category: Computer Components | | Flexible Laptop and so on | in stock | 2260.64 USD |
| Supplier: Talpa | | | | |

General Information  Stock Bins (5 of 214)  Sales Data

Technical Data

Height: 20.0 cm  
Packaging Dimensions: 25 x 21 x 15 cm  
Other

Width: 15.0 cm  
Material: Polycarbonate  
Rating: 2.0  
Condition: New

Depth: 8.3 cm  
Color: Black  
EAN: 0786936258453  
Added to catalog: May 25, 2005

Weight: 4.2 kg

Stock Bins (5 of 214)

Search

| Stock Bin Number | Store Name | Location | Category | Contact | Lot Size | Ordered Quantity |
|---|---|---|---|---|---|---|
| 1008545 | Area mid | Outlook | Warehouse | Solomon Strickland | 17 | 29 |
| 1041364 | Area mid | Juarez | Production Warehouse | Goodwin Carlson | 1 | 25 |
| 1067862 | Area low | Cumberland | Area Warehouse | Meagan Burris | 49 | 73 |
| 1184252 | Department low | Selma | Area Warehouse | Roberts Buckner | 37 | 78 |
| 1209018 | Shelf low | Rivers | Area Warehouse | Kathie Conley | 64 | 15 |

FIG. 3B

Stock Bins of Designer Mouse Unicorn Edition

Location: [ ⌄ ]   Category: [ ⌄ ]    [ < ]                                                                      Adapt Filters  ⇗

Stock Bins (214)

| Stock Bin Number | Store Name | Location | Category | Contact | Lot Size | Ordered Quantity |
|---|---|---|---|---|---|---|
| 1008545 | Area mid | Outlook | Warehouse | Solomon Strickland | 17 | 29 |
| 1041364 | Area mid | Juarez | Production Warehouse | Goodwin Carlson | 1 | 25 |
| 1067862 | Area low | Cumberland | Area Warehouse | Meagan Burris | 49 | 73 |
| 1184252 | Department low | Selma | Area Warehouse | Roberts Buckner | 37 | 78 |
| 1209018 | Shelf low | Rivers | Area Warehouse | Kathie Conley | 64 | 15 |
| 1413265 | Area high | Bangor | Store | April Gill | 71 | 92 |
| 1450460 | Area high | Masthope | Production Warehouse | Alejandra Simmons | 27 | 3 |
| 1477081 | Shelf low | Leland | Warehouse | French Massey | 40 | 95 |
| 1512874 | Shelf mid | Salix | Store | Phoebe Bernard | 52 | 66 |
| 1577732 | Department mid | Norris | Production Warehouse | Carrillo Jensen | 35 | 7 |
| 1640241 | Department high | Richmond | Area Warehouse | Hyde Cannon | 1 | 34 |
| 1714591 | Department mid | Madrid | Warehouse | Santana Berry | 33 | 18 |

FIG. 3D

CONFIGURING COMPLEX TABLES IN A CLIENT EXPERIENCE FRAMEWORK

BACKGROUND

Generally speaking, an organization or individual may use a suite of software applications to improve efficiency. The software applications may be client-server computer programs that provide a wide-array of functionalities to the organizations and individuals. The software applications may employ a framework to facilitate the configuration of customer-specific applications and data elements. Administrators may configure data specific to the businesses and individuals and design particular interface pages to allow users to view and interact with the data. The software applications may exhibit a uniform look and feel to standardize users' interactions with the applications and data therein. The applications may display data in viewable, searchable, filterable, manipulable tables including rows and columns of data as well as sorting, filtering, and searching capabilities.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

FIGS. 3A-3D are example screen displays of an exemplary client experience interface, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
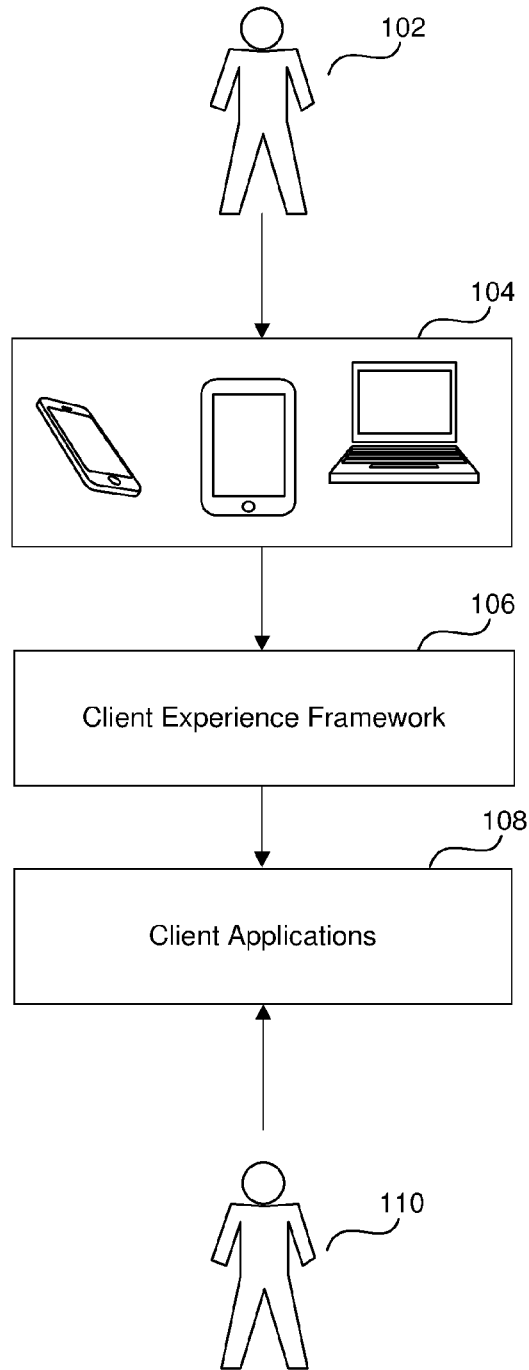
FIG. 1 is a schematic block diagram showing an example system including a client experience framework, according to some embodiments.

Provided herein are system, apparatus, device, method and/or computer program product embodiments, and/or combinations and sub-combinations thereof, for displaying object pages containing data displayed in tables in a client application.

A suite of software applications may include a wide-array of web-based applications. Such applications may span multitudinous services and industries. For example, and without limitation, applications may include customer relationship management tools, enterprise resource planning tools, word processing applications, communication applications, product lifecycle management tools, supply chain management, general business solutions, and many other types of applications. The applications may not be limited only to business needs and individuals may use the applications for entertainment, personal, financial, or any other purposes.

An application in the suite of applications may adhere to a framework through which users may interact with applications in a consistent and familiar fashion. The framework may provide developer toolkits and other modules from which an application may be built. The framework may allow administrators to configure customer-specific applications that capture, store, modify, and display data relevant to the applications. The data may be organized into appropriate objects and the data associated with these objects specifically configured by administrators. The framework may provide a launchpad to centralize the applications, and a user may invoke, run, or launch an application from the launchpad. In an embodiment, a user or business may develop their own web applications and access their custom applications via the launchpad.

A configured object in the applications may display on an object page. An object page may be designed by administrators to display appropriate data in appropriate formats, which may vary according to the industry or business. In an embodiment, the object page may include a header, navigational elements, and data elements associated with the object. Data elements may include text, strings, integers, decimals or other numbers, dates, and other suitable data formats. Data elements may be associated with a label or header.

Data on the object page may display in a table. A table may contain a set of line items, i.e., a table may include columns, rows, and headers. A table may include other interactive controls to edit the data, navigate, explore, and trigger other suitable actions. Tables may be configured to be responsive, list-based, tree-based, gridded, static, etc. Tables may include columns of simple data types (strings, dates, numbers, etc.), but tables may also include more complex data elements, for example, graphs, tables, charts, etc. Tables may include imbedded searching, filtering, parsing, or other advanced functionalities to cull the data, expand the data, or otherwise manipulate and/or interact with the data.

In one simple and merely illustrative example, an object page may display a particular product sold by a particular business. Such an exemplary object page could include a description of the product, an availability, a price, technical data, user ratings, a date of release, and other information relevant to the product or industry. In this example, a table on the object page for this product could display then all records of sales of the product. Search functions could be provided to limit the table by fields relevant for the product, to search by date of sale, to sort the columns, and perform other manipulating functions.

For some client applications and datasets, a table displayed on the object page may become very large, i.e., may include hundreds, thousands, or millions of records or more. In the above product-based example, a product could be very popular, and the table of sales records could include millions of instances of sales records. Such very large tables may cause performance problems in the applications. For example, users may experience slow load times, problems with filtering functionality, browser crashes, etc. Incredibly large tables may also cause problems within the filtering, sorting, and manipulating functions. Large tables may also cause users to scroll through large amounts of rows in order to find a desired record.

Accordingly, a need exists to display data objects with large amounts of data in a table while maximizing performance and reducing performance problems while retaining all available searching and filtering functionality.

FIG. 1 illustrates a schematic block diagram showing an example system 100, according to some embodiments. System 100 may include user 102, client device 104, client experience framework 106, client applications 108, and administrator 110.

User 102 may be an individual or entity using data-driven software applications. User 102 may be a member of a business, organization, or other suitable group using software designed to perform organizational tasks. User 102 may be an individual using software applications for personal pursuits. User 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Computing device 104 may be a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Although computing device 104 is illustrated in the example of FIG. 1 as a single computer, one skilled in the art(s) will understand that computing device 104 may represent two or more computers in communication with one another. Therefore, it will also be appreciated that any two or more components of system 100 may similarly be executed using some or all of the two or more computers in communication with one another.

Client experience framework 106 may provide a means of presenting, configuring, standardizing, and personalizing a user experience for user 102 across a suite of applications. Client experience framework 106 may provide a means of designing and configuring applications, data, objects, object pages, tables, etc. for use by user 102. Client experience framework 106 may adhere to a design methodology by that standardizes applications that use the framework. For example, client experience framework 106 may provide developer toolkits and other modules from which an application may be built. Client experience framework 106 may allow administrators to configure customer-specific applications that include, capture, and display data relevant to the applications.

Client applications 108 may be any number of a myriad of data-driven software applications. Client applications 108 may adhere to the framework provided by client experience framework 106 and may meet and serve diverse requirements. In an alternate embodiment, client applications 108 may be developed and deployed using any suitable technologies and web frameworks. Client applications 108 may be housed on a remote server and delivered over a network to user 102. More than one application in client applications 108 may reside on the same remote server, or client applications 108 may exist on different servers. User 102 may interact with client applications 108 through a web browser or interface such as Chrome, Firefox, etc. via computing device 104. User 102 may also interact with client applications 108 through a mobile application, desktop application, or other suitable module. Client applications 108 may serve a particular function, purpose, or goal, but not necessarily so. Client applications 108 may include dynamic interactions with user 102 through user input and data processing, but client applications 108 may merely relay information without receiving inputs from user 102. The breadth of functionality provided by client applications 108 will be appreciated by one skilled in the relevant art(s) to be expansive and inclusive.

Client applications 108 may be configured to display data objects and other relevant information on an object page. An object page may display a single business object. For example, an object page may display a single order, a single customer, an invoice, a cost center, a product, etc. Such an object page may include a header, navigational elements, and data elements associated with the object. Data elements on the object page may include text, strings, integers, decimals or other numbers, dates, and many other suitable data formats. Data elements may be associated with a label or header.

Client applications 108 may include data on an object page that is displayed in table form. The tables may include columns, rows, headers, and interactive controls to edit the data, navigate, and trigger other suitable actions. The tables may be configured within client applications 108 to adhere to and/or exhibit a complex tables approach. A complex table approach may describe deployment and rendering behaviors of table data on an object page. Client applications 108 may be configured to specify different complex table behavior across data elements, objects, object pages, and tables. Such behaviors may include: lazy loading behavior, tab navigation, and preview to list report.

Client applications 108 may be configured to display a table using lazy loading. Lazy loading may be thought of as a delaying of the loading of table data until a user requests that additional records be loaded. A suitable user request to load additional table data may take a variety of forms, for example, a click, a scroll, a swipe, or other suitable user input gesture. In one embodiment, lazy loading of table data may preliminarily display the first 10 (or other appropriate and/or configurable number) of rows of data in the table. As a user scrolls down and reaches the bottom of the table, the table may load the next 10 records. When the user scrolls down again, the next 10 records may be loaded, and so forth. In one embodiment, during lazy loading, client applications 108 may query a suitable database or backend system each time that additional data is requested. In another embodiment, client applications 108 may retrieve the entire dataset for the table and display the entire dataset.

Client applications 108 may be configured to display a table using a preview version and a link to a list report. In this approach, a preview version of the table is displayed in client applications 108. The preview version of the table displays a configurable number of rows along with any available searching, sorting, and filtering functionalities. For example, a preview version of a table may display only the first 10 records to client applications 108, even though the underlying dataset may include hundreds, thousands, or millions of records or more.

Such a preview version allows a user to interact with the full dataset while viewing only a portion of that dataset. A user only seeing the first 10 records may filter, search, and sort through appropriate modules. These actions may be executed on backend server 230, and the first 10 records displayed to the user in client applications 108 updated based on those actions. For example, a user may see 10 totally different records after the filters are applied. This allows a user to interact with the data without loading the entirety of the dataset in client applications 108 and may avoid performance troubles that could otherwise arise while filtering, searching, and sorting.

The preview version may include a link to the list report, for instance. "Show More (X)," where X is the number of rows in the list report. When the "Show More (X)" link is clicked or otherwise engaged with, a user may be routed to the list report. The list report provides the full range of available sorting and filtering functions as well as the entirety of the dataset undergirding the preview version. In another embodiment, the preview version may include one or more granular intervals, options, etc., for example "Next X," "From X to Y," "First X," "Last Y," etc. When user 102 selects the link to the list report, any filtering, searching, or sorting entered in the preview version may be applied in the list report. In other words, prior user interactions with the dataset in the preview version are preserved when the user is transferred to the list report.

Client applications 108 may be configured to display a table using tab navigation. In tab navigation, an object page may be displayed without the table data in immediate view. However, a tab may be included and by clicking the tab a user may access a subpage on which the full table is displayed.

Administrator 110 may be an employee, engineer, data scientist, business owner, individual, group or other suitable party that configures, enables, or otherwise updates client experience framework 106 for user 102. Administrator 110 may add objects, configure properties for these objects, and deploy these configurations to client applications 108. Administrator 110 may select an appropriate complex table approach for tables deployed in client applications 108 from lazy loading, preview version to list report, and tab navigation.

Figure 2:
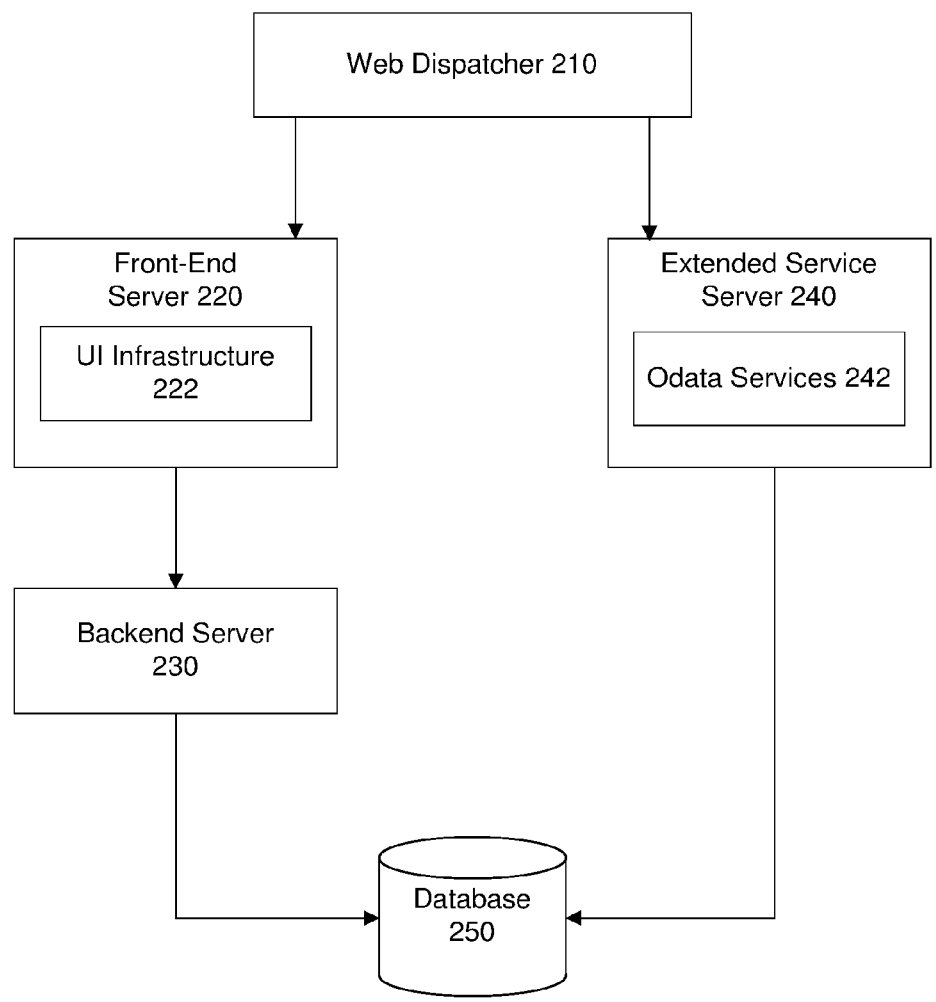
FIG. 2 is a schematic block diagram showing a framework architecture, according to some embodiments.

FIG. 2 is a schematic block diagram showing architecture 200, according to some embodiments. Architecture 200 may include web dispatcher 210, front-end server 220, backend server 230, extended service server 240, and database 250.

Web dispatcher 210 may be a reverse proxy or other suitable method used to route an incoming request from another computing device 110 to an appropriate webserver or processing location. Web dispatcher 210 may employ URL redirection and certificate authentication in order to verify incoming requests and route the requests to the appropriate application server. In an embodiment, the functionality of web dispatcher 210 may be achieved using software, e.g., installable loading balancing or load balancing as a service. In another embodiment, such functionality may be achieved using hardware, for example, with an F5 load balancer or other network or application traffic distribution device. Web dispatcher 210 may employ any suitable routing algorithm to determine servers from among front-end server 220 and extended service server 240 to route traffic to including: round-robin, weighted round-robin, least connections, least response time, etc.

Front-end server 220 may be a suitable application server, web server, or other mechanism for responding to traffic. Front-end server 220 may run on premise, for instance, in a hosted environment, or on the cloud. Front-end server 220 may be implemented using the advanced business application programming language or other suitable high-level programming language, e.g., C/C++, Java, Perl, etc. Front-end server 220 may be divided into a presentation layer (e.g., ASP, JSP, BSP, etc.), business-logic layer (e.g., J2EE runtime environment, java beans, etc.), integration layer (connecting to other application servers or APIs), connectivity layer (e.g., HTTP, HTTPS, SSL, etc.), persistence layer (e.g., SQL, etc.), and other suitable layers. Front-end server 220 may authenticate incoming web traffic, interact with backend systems to formulate appropriate responses, and return these responses to user 102 via web dispatcher 210.

User interface infrastructure 222 may provide components used by framework application 200 to render a user interface for view by user 102 via computing device 104. User interface infrastructure 222 may include a JavaScript user interface library to facilitate dynamic interactions between user 102 and client applications 108. User interface infrastructure 222 may include a development toolkit facilitating the building of HTML5 or mobile applications. User interface infrastructure 222 may allow a business or organization to upgrade the user interface components used by framework application 200 in order to change the experience for user 102 over time. User interface infrastructure 222 may include appropriate stylesheets and design formats to shape, for example, the display format of table data and implement the configurations included in client experience framework 106.

Backend server 230 may connect front-end server 220 to data systems and provide tools and function calls to retrieve and manipulate data. Backend server 230 may be implemented using the advanced business application programming language or other suitable high-level programming language. Backend server 230 may provide remote function calls to interact with data systems. Backend server 230 may, for example, be hosted on, or configured as, a networked computing platform in which a server functions as a database server and provides services to store, retrieve, or analyze data. Such a networked computing platform may, for example, be implemented on premise or in the cloud and be implemented using commercially available computing platform products or custom-developed tools. Backend server 230 may support services that allow user 102 to develop and execute workflows using data from predefined data stores such as applications, web services, flat-files, databases, etc. The services may allow user 102 to combine, transform, present, and refine that data, and output the results back to the same or different data stores. In another embodiment, backend server 230 may, for example, be hosted or launched on a computing device 110 or another computer.

Extended service server 240 may provide a full-featured, self-contained application server, web server, and development environment. Extended service server 240 may provide an application server in framework application 200 without separating the application server and backend server into separate machines. Thus, extended service server may reduce a three-tier architecture including front-end server 220 and backend server 230 to a two-tier architecture. In an embodiment, extended service server 240 may provide a manner of including front-end server 220 and backend server 230 on the same device. Extended service server 240 may include OData services 242.

OData services 242 may be a REST-based protocol for querying and updating data. OData services 242 may be built on standardized technologies such as HTTP, Atom/XML, and JSON. OData services 242 may provide various functions and standardized data models. For example, OData services 242 may support CRUD (Create, Read, Update, Delete) operations for creating and consuming data. In an alternate embodiment, OData services 242 may leverage ODBC, JDBC, .NET, or other suitable access methodology.

Database 250 may be a relational database, a NoSQL database or other horizontally scaling database, or any other database adhering to a suitable database design methodology. Database 250 may harness any commercially available database management system to store data retrievable by client applications 108 or implemented in a custom database management system. In an embodiment, database 250 implements a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, database 250 deploys a hard-disk interface, such as ATA, SATA, SCSI, SAS, and/or fibre for interfacing with storage mediums.

FIGS. 3A-3D are examples of a screen display 300 of an exemplary client experience interface, according to some embodiments. The screen displays provided in FIGS. 3A-3D are merely exemplary, and one skilled in the relevant art(s) will appreciate that many approaches may be taken to provide a suitable screen display 300 in accordance with this disclosure.

Object table 302 may display in client applications 108. Object table 302 may include objects pertinent to the application. Client applications 108 may include various different embodiments of object table 302. Object table 302 may display include columns of data specific to the application. The columns displayed may be configured by administrator 110.

Object 304 may be a business object displayed in object table 302. Object 304 may be configured by administrator 110 to have, for example, a title, a key attribute, a status, a list of object attributes, introductory text, an identifying icon, and other suitable fields. Object 304 may include data of various types including dates, numbers, text, strings, dollar values, etc. Example of object 304 include a single order, a single customer, an invoice, a cost center, a product, and many other objects relevant to user 102.

Filter 306 may provide a mechanism by which user 102 may filter the displayed objects in object table 302. For example, filter 306 may include filters for columns included in object 304. The available filters would vary across clients and be dependent on the nature of the displayed object. Filter 306 may be a dropdown, multi-select, text field, date range, slider, or other appropriate input mechanism.

Object page 308 may display information specific to object 304 after user 102 select an object 304 from object table 302. Object page 308 may be configured for each business by administrator 110. One customer may have many different layouts for object page 308 depending on the type or nature of the object being displayed. A customer may also use the same configuration for each object page 308 in their system. Object page 308 may include details, descriptions, technical data, prices, user ratings, and many other different data fields.

Data table 310 may be a table displayed on object page 308. The fields of data table may be strings, numerical data, dates, or other suitable data formats. Data table 310 may include rows and columns. A row may reflect an instance of data and the columns associated with that instance of data. Various approaches may be taken by client applications 108 to effectively and efficiently display the data in data table 310.

Preview table 312 may be displayed by client applications 108 to provide a subset of data in the underlying dataset as well as limited searching and filtering capabilities without causing the performance problems that might arise if the entirety of the dataset displayed. Preview table 312 may display a configurable number of rows along with a portion of the available searching and/or filtering functionalities. Preview table 312 may include a link to a list report that provides the full range of available sorting and filtering functions as well as the entirety of the dataset undergirding preview table 312.

Search 314 may be a mechanism for searching among the data in data table 310. Search 314 may be used to cull or limit the data displayed. Search 314 may also include other tools facilitating the filtering, sorting, or aggregation of the data in data table 310. Any parameters entered into search 314 may transfer over to the full list report when a user navigates to the full list report.

Link 316 may be a link or other mechanism by which user 102 may access the list report page. In an embodiment, link 316 may display as "Show More (X)," where X is the number of rows in the list report to be displayed.

Full table 318 may be a representation of the full dataset underlying preview table 312. Full table 318 may include columns relevant to the object as configured by administrator 110.

Tools 320 may be additional tools provided by which the data displayed associated with object 304 may be sorted, grouped, filtered, aggregated, or otherwise manipulated.

Figure 3A:
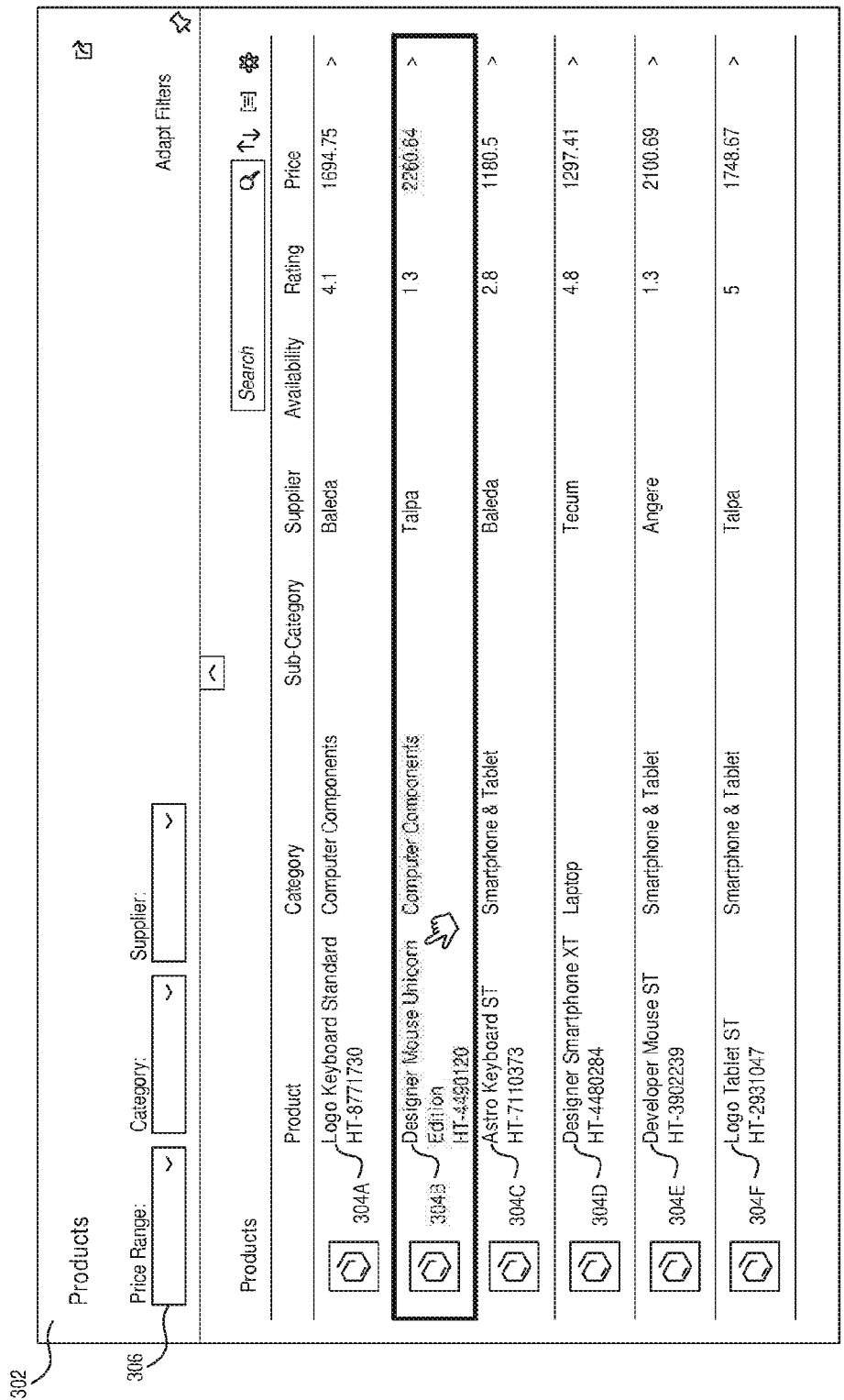

In the example provided in FIG. 3A, client applications 108 displays a page on which object table 302 includes several examples of object 304. In this exemplary illustration, object 304 is a product relevant to client applications 108. The columns displayed in object table 302 include "Product," "Category," "Sub-Category," "Supplier," "Availability," "Rating," and "Price." However, these columns are configurable by administrator 110 and may vary based on the nature of object 304. Here, the available filters among filters 306 display as "Price Range," "Category," and "Supplier." However, filters 306 displayed here are just exemplary. The available filters may vary across clients and be dependent on the nature of the displayed object.

In the example provided in FIG. 3B, an example of object page 308 displays. Here, user 102 selected object 304 from object table 302 displayed in FIG. 3A. Namely, user 102 selected "Designer Mouse Unicorn Edition." Object page 308 displays and includes information about the selected object, in this instance "Designer Mouse Unicorn Edition." Object page 308 would have been configured by administrator 110 for this type of object. In this example, object page 308 displays information including "Details," "Description," "Availability," "Price" "Technical Data" (Height, Width, Depth, Weight, Packaging Dimensions, Material, Color), and "Other" (Rating, EAN, Condition, Added to Catalog). Data table 310 displays and includes a variety of purchase orders for object 304 selected by user 102. For data table 310, columns are displayed for "Stock Bin Number," "Store Name," "Location," "Category," "Contact," "Lot Size," and "Ordered Quantity."

Figure 3C:

In the example provided in FIG. 3C, preview table 312 displays and includes only five entries from a possible two-hundred and fourteen. Search 314 is displayed allowing user 102 to search from among the entire dataset underlying preview table 312. Link 316 allows user 102 to view all of the underlying data behind preview table 312 and displays a total number of records contained in the underlying data.

In the example provided in FIG. 3D, full table 318 displays. The full table 318 displayed may have been entered by user 102 clicking link 316 displayed in FIG. 3C. Full table 318 is a list report including all records in the underlying table. Tools 320 may be displayed and includes the full gamut of available tools via which user 102 may manipulate and explore the data. Tools 320 may include searching, grouping, aggregating, filtering, and other tools of interaction.

Figure 4:
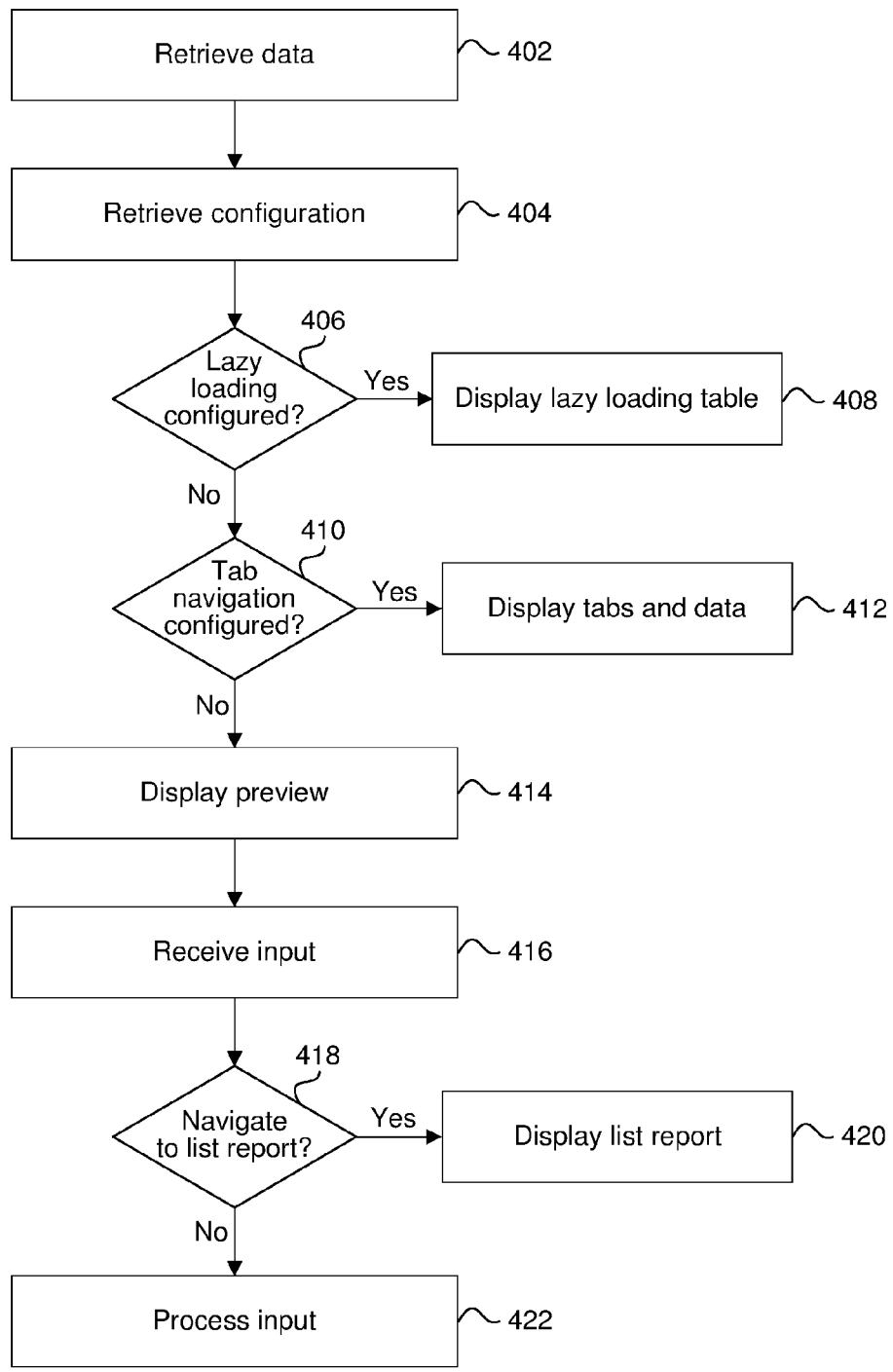
FIG. 4 is a flowchart illustrating a method of displaying a table of data in a client application, according to some embodiments.

FIG. 4 illustrates a method 400 of displaying a table of data in a client application, according to some embodiments. Method 400 can be performed by processing logic that can comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, client applications 108 may retrieve data from database 250. Client applications may interact with web dispatcher 210 to determine an appropriate front-end server 220 or extended server 230 to which to route a web request or other appropriate communication vehicle. Client applications 108 may receive an appropriate HTML or other human-readable page providing the layout and data to be displayed on object page 308. Client applications 108 may receive data to be displayed in table form including information about object 304. Front-end server 220 may interact with backend server 230 in order to retrieve the data from database 250 or extended service server 240 may employ OData services 242 to retrieve the data from database 250. In an embodiment, client applications 108 may retrieve the data in data table 310 as displayed on object page 308 or a subset or portion thereof.

In 404, client applications 108 may retrieve configuration information from client experience framework 106 regarding data displayed on object page 308. Such information may be stored as configuration variables, environment variables, or other suitable flags. The retrieved configuration information may include an indication of whether the table data is to display using lazy loading, via tab navigation, or using a preview version to list report approach. In one embodiment, configuration information is stored in database 250, and client applications 108 may interact with front-end server 220 and/or extended service server 240 to retrieve the configuration. In an alternative embodiment, configuration may be stored locally in configuration files on front-end server 220 and/or extended service server 240. In another embodiment, client experience framework 106 may provide another suitable fashion of retrieving the configuration information.

In 406, client applications 108 may determine if lazy loading is configured for the table data to be displayed on computing device 104. If lazy loading is configured for the relevant data table, then method 400 proceeds to 408. If lazy loading is not configured for the relevant data table, then method 400 proceeds to 410.

In 408, client applications 108 may display data table 310 using lazy loading. Client applications 108 may display a configured or otherwise determined number of rows in data table 310. Upon scrolling, clicking, or other appropriate user behavior, client applications 108 may retrieve another set (i.e., the determined number of rows) and render the rows on object page 308. Such interaction may be iterative until such a point that all rows in the lazy-loaded table display. In an embodiment, client applications 108 may perform separate data retrievals from database 250 or other backend systems for each subsequent data load using, for example, AJAX. In another embodiment, client applications 108 may retrieve the entirety of the underlying dataset and store the dataset locally or otherwise cache the data and retrieve the data from the cache upon request.

In 410, entered from 406 where lazy loading is not configured, client applications 108 may determine if tab navigation is configured for the table data to be displayed on computing device 104. If tab navigation is configured for the relevant data table, then method 400 proceeds to 412. If tab navigation is not configured for the relevant data table, then method 400 proceeds to 414.

In 412, client applications 108 may display a tab-based navigation version of data table 310 on object page 308. Tab navigation may provide an alternate to anchor navigation. Tab navigation may allow navigation across object page 308 using tabs. Data table 308 may be displayed in its entirety on a tab. In an embodiment, for example, a data table having 20 items may be displayed right away in a tab without engaging in any lazy loading. Data table 308 may be displayed in the tab as the last or only element in order to preserve scroll-to-load behaviors. Furthermore, a table placed in a tab may employ lazy loading to load the dataset incrementally.

In 414, client applications 108 may display a preview of the underlying dataset, for example preview table 312. Preview table 312 may display a configurable number of rows. Preview table 312 may include a link to a list report that provides the full range of available sorting and filtering functions as well as the entirety of the dataset undergirding preview table 312. Preview table 312 may also provide Preview table 312 sorting and filtering functions and operations.

In 416, client applications 108 may receive an input from user 102 on preview table 312. The input may be a filtering, sorting, or aggregating function or an activation of the link to the list report page, such as link 316.

In 418, client applications 108 may determine if the input received in 416 specified to navigate to the list report. If navigation to the list report was received, then method 400 proceeds to 420. If navigation to the list report was not received, then method 400 proceeds to 422.

In 420, client applications 108 may display a list report, such as full table 318. The list report may include tools 320 with which to sort and filter the data contained in full table 318. The list report may contain columns of data particular to that object, object page, customer, etc.

In 422, client applications 108 may perform the input processing. This may be a filtering, sorting, or aggregating function performed on preview table 312 or other suitable input.

Figure 5:
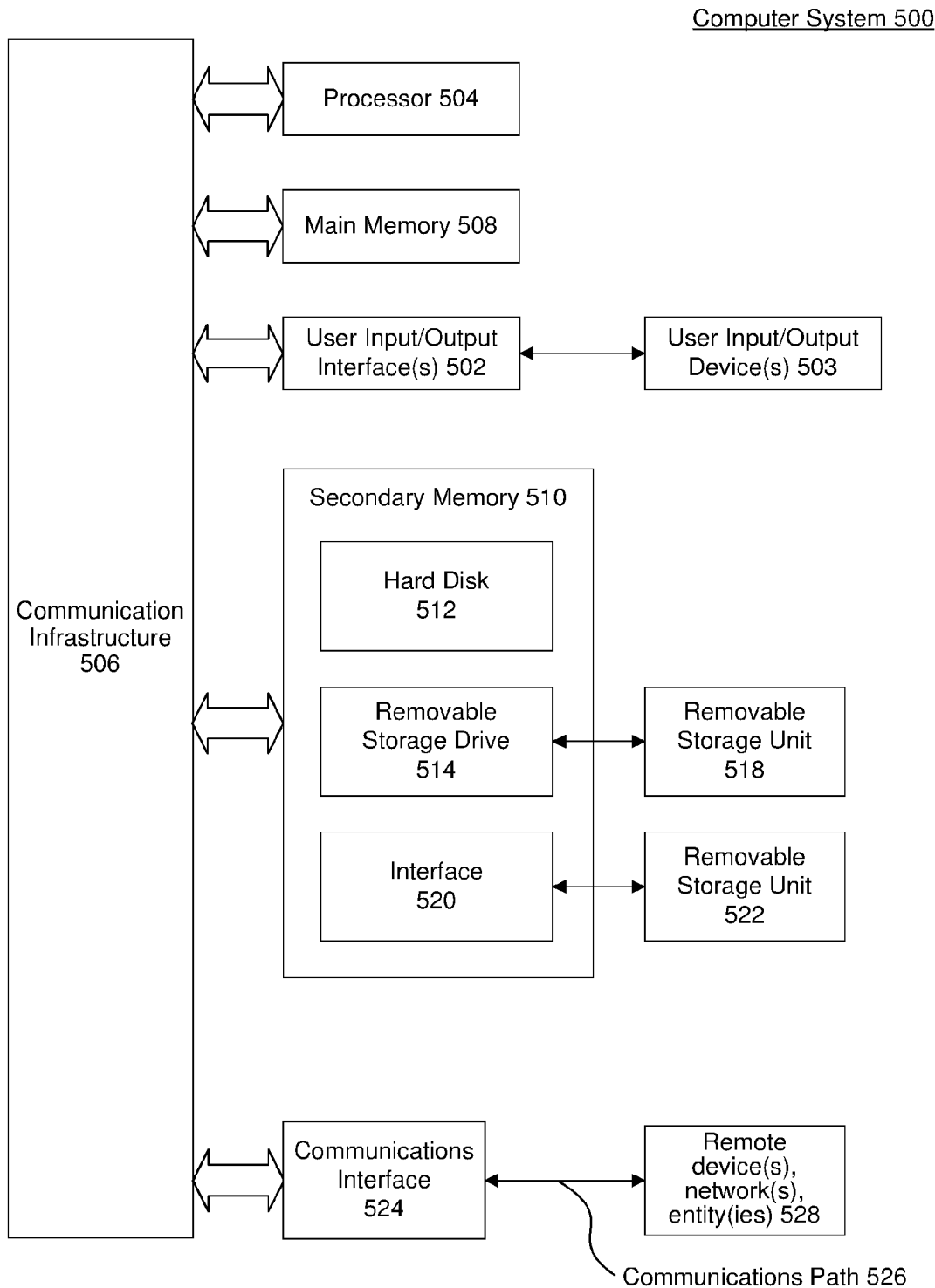
FIG. 5 is an example computer system useful for implementing various embodiments.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
providing, by one or more processors, a client experience framework to an administrator that allows the administrator to design an object page to display in a client application, wherein the object page comprises an object in the client application and a full dataset related to the object comprising rows and columns, wherein the client experience framework allows the administrator to select a complex table behavior associated with the full dataset, and wherein the complex table behavior can be a preview setting;
displaying, by the one or more processors, the object page to a user of the client application by:
retrieving, by the one or more processors, a subset of the full dataset and a display configuration for the full dataset associated with the object page and
when the display configuration indicates the preview setting:
displaying, by the one or more processors, a preview version of a table comprising table headers, the subset of the full dataset, a filter, a record count, and a link, wherein the record count is equal to a number of records in the full dataset, and wherein the link displays the record count, wherein the preview version is configured to allow a user to filter and search through the full dataset while the preview version only displays the subset of the full dataset, wherein filtering comprises limiting the full dataset based on a set of filters selected by the user and wherein searching comprises culling the full dataset based on a set of parameters selected by the user;
receiving, by the one or more processors, a plurality of requests to filter and search through the full dataset;
executing, by the one or more processors, each of the plurality of requests to filter and search through the full dataset;
displaying, by the one or more processors, an updated preview version to reflect changes in the updated full dataset, wherein an updated preview version is automatically generated after each of the plurality of requests to filter and search through the full dataset has been executed after the preview setting has been selected;
receiving, by the one or more processors, an activation of the link from the user;
routing, by the one or more processors, the user to a list report page; and
displaying, by the one or more processors, the list report page comprising at least the updated full dataset undergirding the updated preview version, wherein the updated full dataset reflects any changes in the full dataset for each of the plurality of requests to filter and search through the full dataset has been executed after the preview setting has been selected.

2. The method of claim 1, further comprising:
providing, by one or more processors, the client experience framework that allows the administrator to select the complex table behavior associated with the full dataset, and wherein the complex table behavior can be a preview setting and a lazy loading setting;
retrieving, by one or more processors, a subset of the full dataset and the display configuration for the full dataset associated with the object page and when the display configuration indicates the lazy load setting:
displaying, by one or more processors, a lazy loading version of the table by determining a load count,
displaying, by one or more processors, the subset of the full dataset, receiving a load indicator from the user, and
displaying, by one or more processors, a second subset of the full dataset, wherein the second subset of the full dataset includes a number of records equal to the load count, and wherein the subset of the full dataset is mutually exclusive to the second subset of the full dataset.

3. The method of claim 2, wherein the load indicator is a scroll input from the user.

4. The method of claim 1, further comprising:
receiving, by the one or more processors, a search parameter entered by the user in the filter;
determining, by the one or more processors, a refined subset of the full dataset based on the search parameter; and
displaying, by the one or more processors, the preview version of the table based on the refined subset of the full dataset.

5. The method of claim 1, further comprising:
receiving, by the one or more processors, a sort indicator on a header in the table headers;
sorting, by the one or more processors, the full dataset to determine a sorted subset; and
displaying, by the one or more processors, the preview version of the table based on the sorted subset.

6. The method of claim 1, wherein the complex table behavior can further be a tab navigation setting, and further comprising:
when the display configuration indicates the tab navigation setting:
displaying, by the one or more processors, a set of links in tabular form;
receiving, by the one or more processors, a tab indicator from the user;
retrieving, by the one or more processors, the full dataset based on the tab indicator; and
displaying, by the one or more processors, the retrieved full dataset.

7. The method of claim 1, further comprising:
retrieving the second subset of the full dataset in response to the load indicator using an asynchronous call.

8. A system, comprising:
a memory; and
at least one processor coupled to the memory, the at least one processor configured to:
provide a client experience framework to an administrator that allows the administrator to design an object page to display in a client application, wherein the object page comprises an object in the client application and a full dataset related to the object comprising rows and columns, wherein the client experience framework allows the administrator to select a complex table behavior associated with the full dataset, and wherein the complex table behavior can be a preview setting;

display the object page to a user of the client application by:

retrieving a subset of the full dataset and a display configuration for the full dataset associated with the object page and when the display configuration indicates the preview setting:

displaying a preview version of a table comprising table headers, the subset of the full dataset, a filter; a record count, and a link, wherein the record count is equal to a number of records in the full dataset, and wherein the link displays the record count, wherein the preview version is configured to allow a user to filter and search through the full dataset while the preview version only displays the subset of the full dataset, wherein filtering comprises limiting the full dataset based on a set of filters selected by the user and wherein searching comprises culling the full dataset based on a set of parameters selected by the user;

receiving, by the one or more processors, a plurality of requests to filter and search through the full dataset;

executing each of the plurality of requests to filter and search through the full dataset;

displaying an updated preview version to reflect changes in the updated full dataset, wherein an updated preview version is automatically generated after each of the plurality of requests to filter and search through the full dataset has been executed after the preview setting has been selected;

receiving, by the one or more processors, an activation of the link from the user;

routing, by the one or more processors, the user to a list report page; and displaying the list report page comprising at least the updated full dataset undergirding the updated preview version, wherein the updated full dataset reflects any changes in the full dataset for each of the plurality of requests to filter and search through the full dataset has been executed after the preview setting has been selected.

9. The system of claim 8, the at least one processor further configured to:

provide the client experience framework that allows the administrator to select the complex table behavior associated with the full dataset, and wherein the complex table behavior can be a preview setting and a lazy loading setting;

retrieve a subset of the full dataset and the display configuration for the full dataset associated with the object page and when the display configuration indicates the lazy load setting:

display a lazy loading version of the table by determining a load count, display the subset of the full dataset, receiving a load indicator from the user, and display a second subset of the full dataset, wherein the second subset of the full dataset includes a number of records equal to the load count, and wherein the subset of the full dataset is mutually exclusive to the second subset of the full dataset.

10. The system of claim 9, wherein the load indicator is a scroll input from the user.

11. The system of claim 8, the at least one processor further configured to:

receive a search parameter entered by the user in the filter;

determine a refined subset of the full dataset based on the search parameter; and display the preview version of the table based on the refined subset of the full dataset.

12. The system of claim 8, the at least one processor further configured to:

receive a sort indicator on a header in the table headers;

sort the full dataset to determine a sorted subset; and display the preview version of the table based on the sorted subset.

13. The system of claim 8, wherein the complex table behavior can further be a tab navigation setting, the at least one processor further configured to:

when the display configuration indicates the tab navigation setting:

display a set of links in tabular form;

receive a tab indicator from the user;

retrieve the full dataset based on the tab indicator; and display the retrieved full dataset.

14. The system of claim 8, the at least one processor further configured to:

retrieve the second subset of the full dataset in response to the load indicator using an asynchronous call.

15. A non-transitory computer-readable device having instructions stored thereon that, when executed by at least one computing device, cause the at least one computing device to perform operations comprising:

providing a client experience framework to an administrator that allows the administrator to design an object page to display in a client application, wherein the object page comprises an object in the client application and a full dataset related to the object comprising rows and columns, wherein the client experience framework allows the administrator to select a complex table behavior associated with the full dataset, and wherein the complex table behavior can be a preview setting;

displaying the object page to a user of a client application by: retrieving a subset of the full dataset and a display configuration for the full dataset associated with the object page and when the display configuration indicates the preview setting:

displaying a preview version of a table comprising table headers, the subset of the full dataset, a filter; a record count, and a link, wherein the record count is equal to a number of records in the full dataset, and wherein the link displays the record count, wherein the preview version is configured to allow a user to filter and search through the full dataset while the preview version only displays the subset of the full dataset, wherein filtering comprises limiting the full dataset based on a set of filters selected by the user and wherein searching comprises culling the full dataset based on a set of parameters selected by the user;

receiving a plurality of requests to filter and search, through the full dataset;

executing each of the plurality of requests to filter and search through the full dataset;

displaying an updated preview version to reflect changes in the updated full dataset, wherein an updated preview version is automatically generated after each of the plurality of requests to filter and search through the full dataset has been executed after the preview setting has been selected;

receiving an activation of the link from the user;

routing the user to a list report page; and displaying the list report page comprising at least the updated full dataset undergirding the updated preview version, wherein the updated full dataset reflects any changes in the full dataset for each of the plurality of requests to filter and search through the full dataset has been executed after the preview setting has been selected.

16. The non-transitory computer-readable device of claim 15, the operations further comprising:

providing the client experience framework that allows the administrator to select the complex table behavior associated with the full dataset, and wherein the complex table behavior can be a preview setting and a lazy loading setting;

retrieving a subset of the full dataset and the display configuration for the full dataset associated with the object page and when the display configuration indicates the lazy load setting:

displaying a lazy loading version of the table by determining a load count, displaying the subset of the full dataset, receiving a load indicator from the user, and displaying a second subset of the full dataset, wherein the second subset of the full dataset includes a number of records equal to the load count, and wherein the subset of the full dataset is mutually exclusive to the second subset of the full dataset.

17. The non-transitory computer-readable device of claim 16, wherein the load indicator is a scroll input from the user.

18. The non-transitory computer-readable device of claim 15, the operations further comprising:

receiving a search parameter entered by the user in the filter;

determining a refined subset of the full dataset based on the search parameter; and displaying the preview version of the table based on the refined subset of the full dataset.

19. The non-transitory computer-readable device of claim 15, the operations further comprising:

receiving a sort indicator on a header in the table headers;

sorting the full dataset to determine a sorted subset; and displaying the preview version of the table based on the sorted subset.

20. The non-transitory computer-readable device of claim 15, the operations further comprising:

retrieving the second subset of the full dataset in response to the load indicator using an asynchronous call.

* * * * *